455/3

Feb. 13, 1968 C. R. STRADLEY 3,369,078

SYSTEM FOR TRANSMITTING STEREOPHONIC SIGNALS
OVER ELECTRIC POWER LINES

Filed June 28, 1965

INVENTOR.
CHARLES R. STRADLEY

BY McGraw & Edwards

ATTORNEYS 3,369,078
SYSTEM FOR TRANSMITTING STEREOPHONIC SIGNALS OVER ELECTRIC POWER LINES

Charles R. Stradley, 3021 E. Peakview Circle, Littleton, Colo. 80120

Filed June 28, 1965, Ser. No. 467,377
3 Claims. (Cl. 179—2.5)

This invention relates to audio signal transmitting systems and particularly to an improved system utilizing the electrical wiring of a building for transmitting stereophonic signals from a central source to locations throughout the building.

Various wiring systems have been designed heretofore for the purpose of providing radio programs, phonograph recordings and the like throughout building structures. These systems have included arrangements for utilizing the house electrical wiring system for the transmission of programs or other signals. The problem of obtaining adequate signals with minimum distortion at points remote from the central signal source becomes further complicated when stereophonic signals are to be employed. Accordingly, it is an object of the present invention to provide an improved system for transmitting stereophonic signals over the electric power wiring of a building to make the signals available for reception throughout the building.

It is another object of this invention to provide an improved system utilizing a house wiring circuit for transmitting sterophonic signals which affords increased signal strength and minimum interference between signals.

Briefly, in carrying out the objects of this invention in one embodiment thereof, a central signal source such as a stereophonic record player or other audio signal source is provided with a signal output which is coupled to the electric power system of a residence or other building. The coupling is effected by two variable inductance coupling units each having its primary winding connected to the output of a respective stereophonic signal source and with the secondary windings of both units connected in series with one another and in series with the primary winding of the power transformer, all windings thus being connected in series across the power source. The power transformer includes a secondary winding connected through a suitable power supply in the usual manner to supply the required values of voltage and current for operation of the stereophonic systems and their respective carrier channels.

The stereophonic signals supplied to the coupling units comprise radio frequency carriers at frequencies sufficiently separated to prevent interference and each modulated by a respective portion of the stereophonic recording or other audio source. The carrier frequencies are bypassed around the primary winding of the power transformer so that these frequencies do not affect the power supply.

Figure 1:
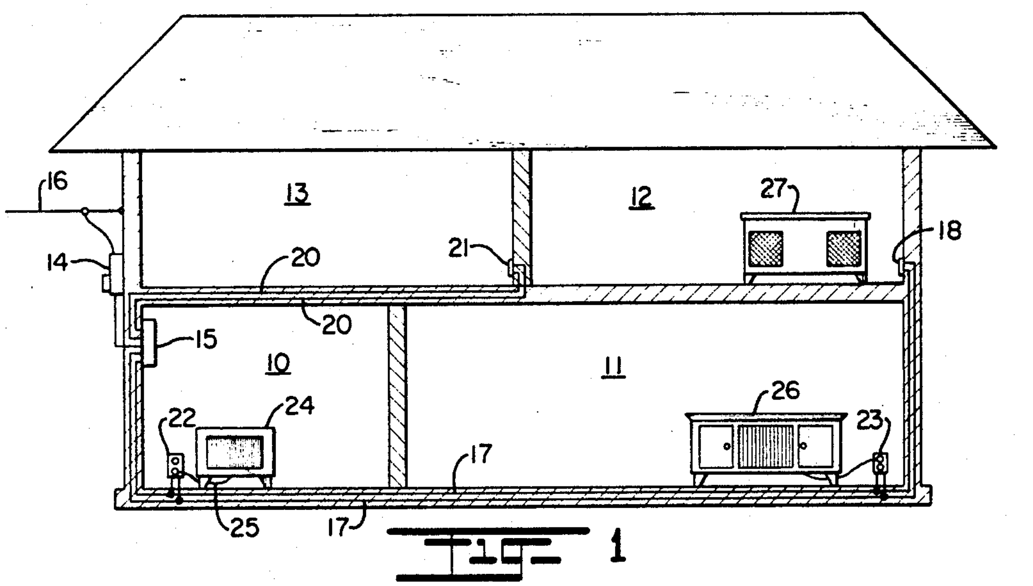
Figure 2:
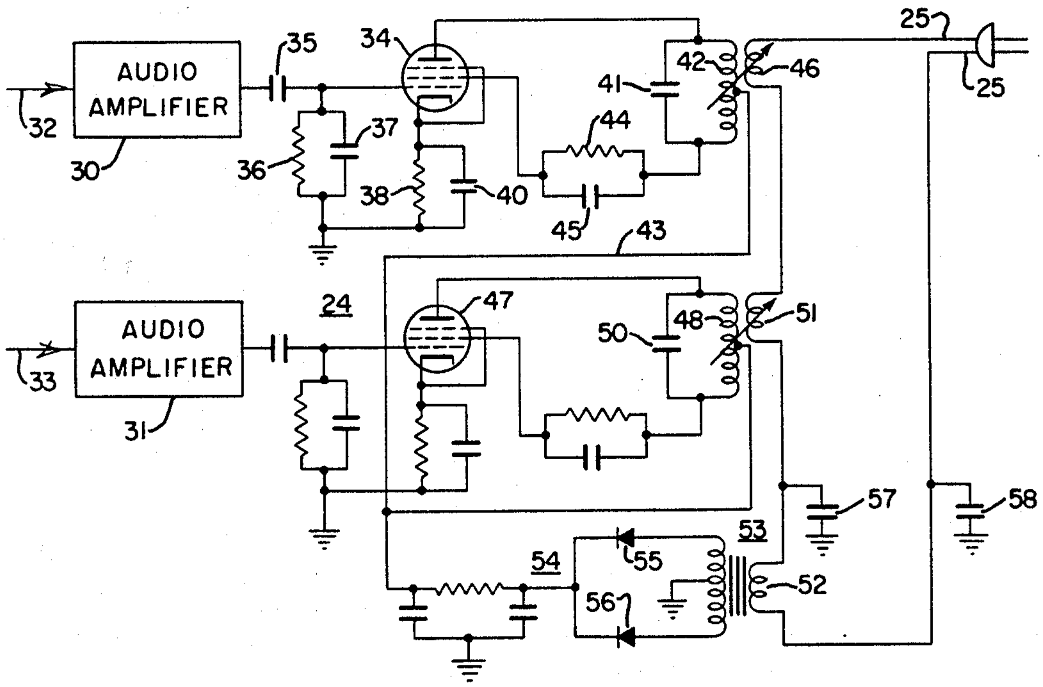

The features of novelty which characterize this invention are pointed out with particularity in the claims annexed to and forming a part of this specification. The invention itself, however, both as to its organization and method of operation, together with further objects and advantages thereof, will best be understood by reference to the following description taken in connection with the accompanying drawings in which:

FIG. 1 is a diagrammatic illustration of a building provided with a stereophonic signal transmitting system embodying the invention; and FIG. 2 is a circuit diagram of the central signal source and coupling arrangement for a system embodying the invention.

Referring now to the drawing, FIG. 1 illustrates a building having four rooms 10, 11, 12 and 13 and an electrical wiring system including an input box and meter 14 and a switch box 15 connected to a lead-in line 16. The wiring system includes two-wire cables arranged throughout the house in the usual manner and being represented by a set of leads 17 extending across the lower floor and up to an outlet 18 in the room 12 and a second set of leads 20 indicated as extending from the switch box 15 across the lower floor of the room 13 to an outlet 21. An outlet 22 is provided in the room 10 from the lead 17 and a similar outlet 23 in the room 11.

A stereophonic signal source such as a record player indicated at 24 is provided in the room 10 and is supplied with power current from the line 17 through a plug-in lead 25 in the usual manner. A stereophonic receiver 26 is illustrated as located in the room 11 and plugged into the outlet 23 for power supply purposes and a second stereophonic receiver 27 has been illustrated as located in the room 12, this receiver being of the battery powered transistor type and not requiring a lead-in plug to the outlet 18.

The central signal generating source 24 is provided with a circuit embodying the invention which impresses the two portions of a stereophonic signal on the power lines 17, each comprising audio signals modulated on a different respective carrier frequency. The operation of the signal source 24 as thus coupled to the power line 17 is such that both the receivers 26 and 27 readily pick up the signals and detect the separate stereo channels in the usual manner for reproduction of sound in the rooms 11 and 12, respectively.

The unit 26 may be arranged to pick up the signal by coupling to the power leads. However, it has been found that separate coupling is not essential for this purpose and the unit 27, for example, which is provided with no such coupling, readily picks up the signal radiated from the power circuit and reproduces it with full fidelity in the room 12. The circuits of the receivers 26 and 27 have not been illustrated as they are not essential to an understanding of the present invention. Any stereophonic receiver capable of receiving radio broadcast signals is suitabut for use in the system and adequate to receive and reproduce the signals from the house wiring system whether or not it is coupled to the power lines. It has been found that with the system of the invention, signals of sufficient strength for transmission and reception throughout a building are readily provided through the power lines located in the building and will adequately energize receivers within the confines of the building, it being necessary merely that the receiver be tunable to the carrier frequencies of the respective two portions of the stereophonic signal.

In addition to providing effective and ample loading of the wiring system to secure adequate and accurate sterephonic signals throughout the system, a coupling arrangement is provided at the power transformer which effectively suppresses noise such as that produced by fluorescent lamps and other sources connected to the electrical wiring system.

FIG. 2 illustrates the circuit of the stereophonic source 24 and the arrangement for coupling the circuit to the power system. As illustrated in this diagram, the unit 24 includes first and second audio amplifiers 30 and 31 for amplifying respective portions of a stereophonic signal received from suitable sources such as a record player pickup (not shown) and connected to the amplifiers by leads 32 and 33, respectively.

The output signal of the amplifier 30 is coupled to an electron discharge device 34 through a capacitor 35 across a network comprising a resistance 36 and a capacitor 37. The electron discharge device 34 acts both as an oscillator tube and a modulator and has been illustrated as a pentode connected to ground through a network including a resistance 38 bypassed by a capacitor 40. The output circuit of the tube 34 includes a capacitor 41 and a variable inductance 42 connected in parallel, the inductance 42 being center-tapped and connected to the positive side of the plate or anode source through a lead 43. The screen grid of the tube 34 is connected to the output network through a resistance 44 and a capacitance 45 in parallel and this provides a feedback voltage through the lower half of the inductance coil 42. The screen grid circuit operates as an oscillator tuned by adjustment of the inductance 42. The inductance 42 is of the plug-tuned type employing a center core and thus the circuit may be tuned to a selected carrier frequency. The tube 34 thus performs two functions, acting as an oscillator and also as a modulator for supplying a modulated carrier to a winding 46 coupled to the inductance 42; the winding 46 is a current winding having few turns and being connected in the power circuit in series with the lines 25.

The lower stereophonic channel for receiving the signal from the amplifier 31 is of the same construction as the upper channel and includes a pentode 47 connected as a modulator and an oscillator tuned by adjustment of a variable inductance 48 and capacitance 50 in parallel; the inductance is center-tapped in the same manner as the inductance 42 and the output of the lower channel is coupled to the power lines through an inductance 51. The inductance 51 is connected in series with the inductance 46 and with a primary winding 52 of a power transformer 53 which supplies the conventional power supply indicated at 54; this power supply provides the D.C. potentials for operation of the tubes 34 and 47 through a full-wave rectifier including diodes 55 and 56.

Both terminals of the primary winding 52 of the power transformer are connected to ground at radio frequencies by capacitors 57 and 58 and the passage of radio frequency signals through the power supply is thereby prevented.

It will now be apparent that the windings 46 and 51 are connected in series with the primary winding 52 of the power transformer and with the power supply leads 25 and thus the two stereophonic channels are coupled directly to the power circuit so that the signals are transmitted throughout the building on the leads 17 and 20 when the supply lead 25 is plugged into the outlet 22.

It has been found that this circuit operates to provide excellent loading of the power system with the stereophonic signals and at the same time effectively prevents interference between the signals of the two channels; this arrangement has been found to avoid the following or locking of one of the oscillators with the other during the operation of the system The two channels are thus effectively isolated from one another and the signals may be picked up by the receiving units 26 and 27 to produce high fidelity signals from both channels Stereophonic signal transmitting systems embodying the invention have been employed in buildings to transmit signals to receivers located at remote points throughout the building and have been found highly satisfactory in operation. By way of example and not by way of limitation, one transmitting system for stereophonic signals and embodying the invention was built and operated wherein the audio signal of one stereophonic channel was modulated on a 1650 kilocycle carrier and the other channel on a 1750 kilocycle carrier. The variable inductances 42 and 48 were tunable within a range of from 82 to 132 microhenries and the capacitors 41 and 51 had a capacitance of 75 micromicrofarads each. The inductances 42 and 48 were tuned by movable powdered iron cores. The tubes 34 and 47 were type 6BM8 pentodes and the remaining components of both circuits had the following values as represented by the numbered components of the circuit of the tube 34.

| | | |
|---|---|---|
| Capacitor **35** | microfarad | .01 |
| Grid resistance **36** | megohms | 1.5 |

| | | |
|---|---|---|
| Bypass capacitor **37** | microfarad | .001 |
| Cathode resistance **38** | ohms | 1000 |
| Cathode bypass **40** | microfarads | 25 |
| Screen bias resistor **44** | ohms | 47,000 |
| Screen resistance bypass **45** | micromicrofarads | 150 |
| Output bypass capacitors **57** and **58** for the coil **52** (each) | microfarad | .01 |

A stereophonic signal transmitting system having the values indicated above was connected to energize a conventional house wiring system and found to produce highly accurate and strong signals throughout the building. In addition, undesirable noises due to electrical appliances, fluorescent lights and the like were effectively eliminated from the signals at the receivers.

While the invention has been illustrated and described in connection with a particular arrangement of receivers and specific electronic components, various other applications and arrangements will occur to those skilled in the art. Therefore it is not desired that the invention be limited to the details of construction illustrated and described and it is intended by the appended claims to cover all modifications which fall within the spirit and scope of the invention.

I claim:

1. A coupling and loading device for impressing stereophonic signals on electric power lines which comprises a power supply circuit, first and second audio signal channels, means for modulating the first channel on a first carrier wave and the second channel on a second carrier wave, a power transformer for supplying energy from said power circuit to said channels, output transformers for said channels each having a primary winding and a secondary winding, means connecting said secondary windings of said output transformers in series with one another and with the primary winding of said power transformer, and means for bypassing radio frequency energy to ground around said power transformer at both terminals of said power transformer primary winding.

2. In a system for the transmission of stereophonic signals within a building having an electric power supply system including two conducting lines, first and second source means for generating stereophonic signals, means for generating first and second carrier waves at different frequencies, means for modulating said first carrier wave with signals from said first source, means for modulating said second carrier wave with signals from said second source, first and second output transformers each having a primary winding and a secondary winding, a power transformer having a primary winding connected across said lines of said power system and a secondary winding for supplying power to said signal and carrier wave generating means, means connecting the secondary windings of said output transformers in series with one another and with the primary winding of said power transformer, and means for connecting both terminals of said power transformer primary to ground at radio frequencies for facilitating the loading of one of said lines with said first and second carrier waves modulated respectively by signals produced by said first and second source means.

3. A system for the transmission of stereophonic signals within a building having an electric power supply system as set forth in claim 2 wherein the primary windings of said output transformers have a high number of turns and the secondaries thereof have few turns.

References Cited

UNITED STATES PATENTS

| | | | |
|---|---|---|---|
| 1,856,310 | 5/1932 | Blatterman. | |
| 2,268,812 | 1/1942 | Foster et al. | |
| 2,295,442 | 9/1942 | Wilhelm | 340—310 |
| 2,883,459 | 4/1959 | Roy | 179—2.5 |

JOHN W. CALDWELL, *Primary Examiner.*

T. T. STRATMAN, *Assistant Examiner.*